(No Model.)

I. E. STOREY.
ELECTRIC MOTOR OR GENERATOR.

No. 418,853. Patented Jan. 7, 1890.

WITNESSES:
Raymond F. Barnes
Wm A Rosenbaum

INVENTOR
Imle E. Storey.
Johnston
ATTORNEY

UNITED STATES PATENT OFFICE.

IMLE E. STOREY, OF BOULDER, COLORADO.

ELECTRIC MOTOR OR GENERATOR.

SPECIFICATION forming part of Letters Patent No. 418,853, dated January 7, 1890.

Application filed April 16, 1889. Serial No. 307,418. (No model.)

*To all whom it may concern:*

Be it known that I, IMLE E. STOREY, a citizen of the United States, residing in Boulder, in the county of Boulder and State of Colorado, have invented certain new and useful Improvements in Electric Motors or Generators, of which the following is a specification.

My invention relates to electric motors or generators with a view to improving the construction of the field-magnets and the magnetic circuit generally, to the end that increased efficiency may be obtained and a form of motor particularly adapted to electric drills provided. The field-magnets are inclosed in a laminated ring. They consist of four spools radiating from the center and bolted to the inside of the ring.

The details of construction will now be described with reference to the accompanying drawings, in which—

Figure 1:
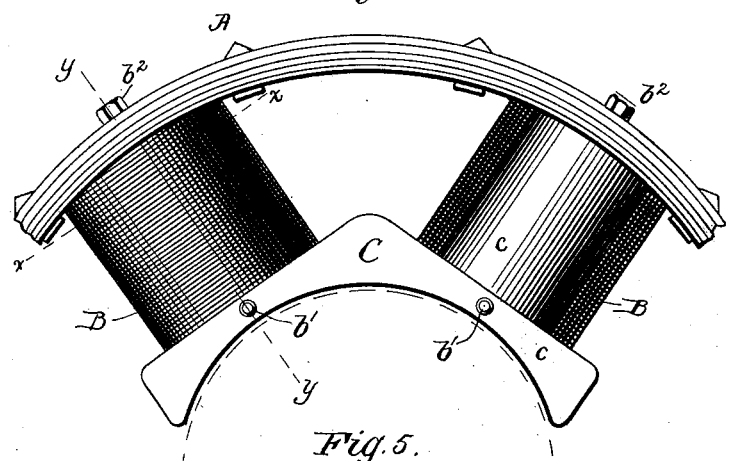
Figure 5:
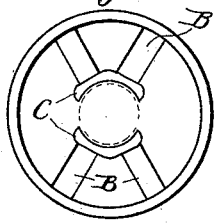
Figure 2:
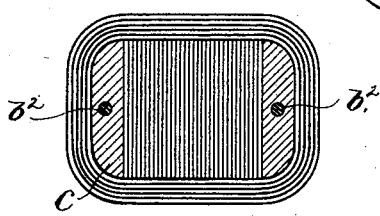
Figure 3:
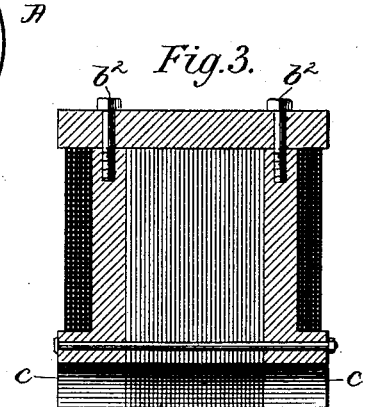
Figure 4:
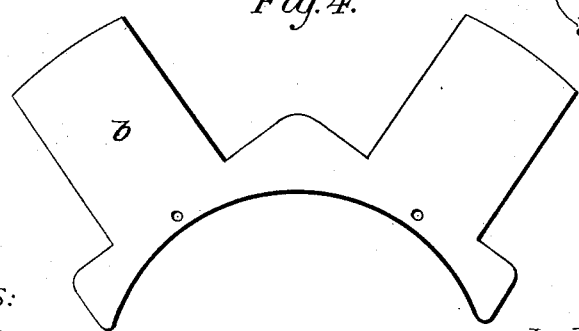

Figure 1 represents an elevation, partly in section, of one side of the machine, the other side being its counterpart. Fig. 2 represents a section of one of the magnets, taken on line $x\ x$ of Fig. 1. Fig. 3 is a section taken on line $y\ y$ of Fig. 1. Fig. 4 is a view of one of the plates of which the magnets are built up; and Fig. 5 is a diagrammatical view, on a small scale, of the complete magnet.

A represents a ring or shell made up of laminations or of a continuous strip of soft iron wound spirally and riveted together at intervals. The field-magnet spools B are four in number and are grouped in pairs, the spools of each pair having a common pole-piece C. I secure this construction by building up the magnets of a number of plates $b$. (Shown in Fig. 4.) Each plate aids in the building up of both magnets and the common poles of each pair. A number of these plates are placed together or on top of each other and are bound together by means of bolts $b'$ and $b^2$. Against the top and bottom plates I place a drop-forged piece of steel $c$, having the same shape in outline as the plates themselves, but of different cross-section. The bolts $b'$ pass laterally through the pieces $c$ and the plates. The bolts $b^2$ pass through the ring A and into the ends of pieces $c$. In this way the parts of the magnet are held together and the spools secured to the ring. That portion of the pieces $c$ surrounding the pole-pieces is formed with a shoulder to confine the winding which surrounds the body of the core.

This form of motor I have found to be well adapted for driving drills, as it is compact in structure and is well fitted to be secured in the drill-frame. The laminations, besides preventing heating, also enable me to build this form of motor cheaply.

Having thus described my invention, I claim—

1. An electric motor or generator embodying an annulus of iron, to the inner side of which are secured four field-magnets arranged in pairs, the magnets of each pair connected to a common pole-piece.

2. An electric motor or generator embodying an annulus of laminated iron, to the inner side of which are secured a plurality of field-magnets having laminated cores, for the purpose described.

3. An electric motor or generator embodying an annulus of laminated iron, to the inner side of which are secured a plurality of field-magnets having laminated cores, said magnets being arranged in pairs and the magnets of each pair connected to a common pole-piece.

In witness whereof I have hereunto signed my name in the presence of two subscribing witnesses.

IMLE E. STOREY.

Witnesses:
WM. A. ROSENBAUM,
THOMAS K. TRENCHARD.